G. W. MANSON.
Churn.
No. 62,046.  Patented Feb. 12, 1867.
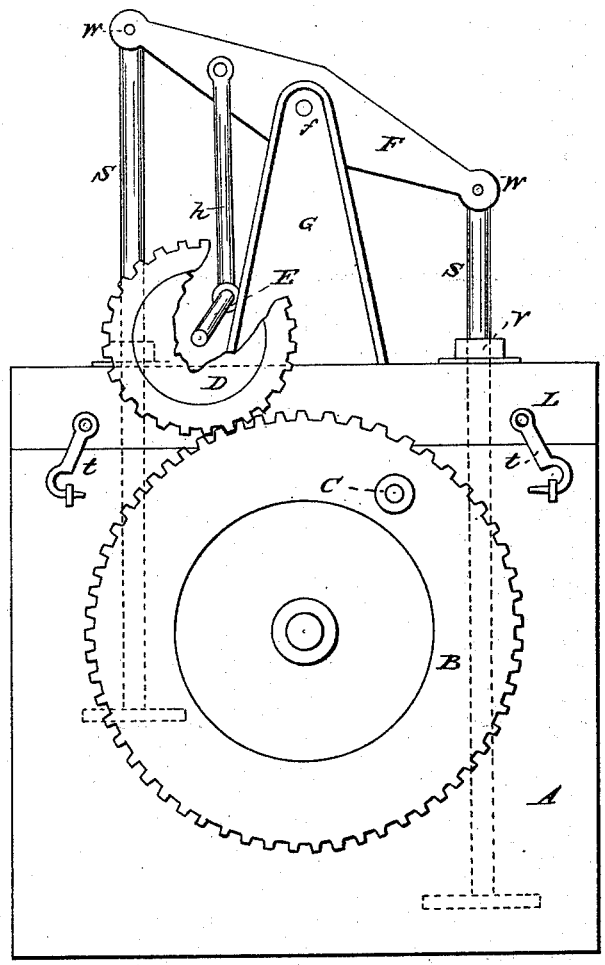
Witnesses:
William H Clifford
Henry C Houston
Inventor:
George W. Manson

United States Patent Office.

GEORGE W. MANSON, OF BUXTON, MAINE, ASSIGNOR TO NICHOLAS W. MANSON, OF SAME PLACE.

Letters Patent No. 62,046, dated February 12, 1867.

IMPROVEMENT IN CHURNS.

The Schedule referred to in these Letters Patent and making part of the same.

TO ALL WHOM IT MAY CONCERN:

Be it known that I, GEORGE W. MANSON, of Buxton, in the county of York, and State of Maine, have invented a new and useful Improvement in Churns; and I hereby declare the following to be a full, clear, and exact description thereof, which will enable others to make and use my invention, reference being had to the accompanying drawings, forming part of this specification, in which is illustrated the subject of my invention, consisting in a combination of devices for operating two dashers in a churn, the dashers moving vertically.

A shows the body of a churn, constructed of the form indicated in the drawing. B shows a wheel fitted with gearing, and revolving upon an axis set into the side of the body of the churn; c, the crank by which the wheel is turned. D is a smaller wheel, whose gearing works into that of B. The wheel D is four times smaller than B. E is a crank-shaft, upon the end of which the wheel D is rigidly attached. F is a working-beam, oscillating upon the pivot $f$ on the support G, and moved by the crank-shaft by means of the connecting-rod $h$. To the ends of the working-beam are attached dashers $s\ s$. The revolution of the wheel B moves the working-beam F by the wheel D, crank-shaft E, and rod $h$. L shows the churn cover, held by the hooks $t\ t$. On the churn body, and immediately within the cover L, is a moulding, over which the cover L is placed to prevent the contents of the churn, when being used, from escaping. The dashers $s\ s$ work through the stuffing-boxes $v\ v$. In each of these is fixed a disk of rubber, having a perforation, which tightly encompasses the dasher, in order to retain within the churn all of the contents thereof adhering to the dasher at each successive stroke. $w\ w$ show set-screws attaching the dashers to the working-beam. When the cover L is required to be removed, these screws are taken out, the dashers freed from the working-beam, and left standing in the churn. The crank-shaft is secured at its ends by supports on the cover of the churn.

I do not claim a churn of any particular construction; neither do I claim the arrangement or operation of the two dashers; neither do I claim any form or description of dashers.

The rejected application of Isaac B. Jones, received and filed June 28, 1862, embraces a claim for a different combination from that exhibited in my application, and includes a different method of operating the churn dashers.

I do not claim a churn in two compartments, separated by a partition, with apertures at the bottom, when used in combination with two dashers in each compartment, these two sets of dashers being operated in opposite directions; neither do I claim the combination of two geared wheels, two connecting-rods, and two levers, for the purpose of moving two sets of double dashers, the two connecting-rods being attached to two cranks set in opposite directions; neither do I claim the device for a churn as shown and described in "Low's Elements of Agriculture," page 542, figs. 178 and 179; but what I do claim, and desire to secure by Letters Patent, is—

As a means of imparting motion to two dashers in a churn, the arrangement of the geared wheel B, geared wheel D, crank-shaft E, connecting-rod $h$, and working-beam F swinging on the support G, the working-beam F being so connected with the two dashers that it can be separated from the dashers when the cover of the churn is to be removed, in the manner and for the purposes set forth.

GEORGE W. MANSON.

Witnesses:
   THOS. E. BRADBURY,
   SAMUEL HILL.